United States Patent
Yoakum et al.

(10) Patent No.: US 8,108,444 B1
(45) Date of Patent: Jan. 31, 2012

(54) BUDDY LISTS FOR INFORMATION VEHICLES

(75) Inventors: John H. Yoakum, Cary, NC (US); Philip Edholm, Pleasanton, CA (US)

(73) Assignee: Rockstar Bidco, LP, New York, NY (US)

( * ) Notice: Subject to any disclaimer, the term of this patent is extended or adjusted under 35 U.S.C. 154(b) by 432 days.

(21) Appl. No.: 10/866,482

(22) Filed: Jun. 12, 2004

(51) Int. Cl.
*G06F 17/30* (2006.01)
*G06F 7/00* (2006.01)

(52) U.S. Cl. ....................................... 707/803
(58) Field of Classification Search .................. 707/102, 707/10, 104.1, 803, 202; 709/202
See application file for complete search history.

(56) References Cited

U.S. PATENT DOCUMENTS

| | | | | |
|---|---|---|---|---|
| 7,310,675 | B2 * | 12/2007 | Salesky et al. ................ | 709/227 |
| 2001/0013050 | A1 * | 8/2001 | Shah ............................ | 709/202 |
| 2003/0050539 | A1 * | 3/2003 | Naghavi et al. ............... | 600/300 |
| 2004/0006478 | A1 * | 1/2004 | Alpdemir et al. ............. | 704/275 |
| 2004/0203969 | A1 * | 10/2004 | Videtich ....................... | 455/512 |
| 2005/0027716 | A1 * | 2/2005 | Apfel ............................ | 707/100 |
| 2005/0059418 | A1 * | 3/2005 | Northcutt ...................... | 455/517 |

* cited by examiner

*Primary Examiner* — Kuen S Lu
(74) *Attorney, Agent, or Firm* — Withrow & Terranova, PLLC

(57) ABSTRACT

The present invention creates a buddy list in association with an information vehicle, such as a word processing document, presentation document, or email. The buddy list is created from contacts associated with the information vehicle, and includes communication information such as directory numbers or communication addresses, which are sufficient to establish communications with the contacts. Accordingly, the buddy list may be displayed to a user, and upon the selection of one or more contacts, communication sessions may be established with the selected contact or contacts. Presence information bearing on the relative availability of the contacts may be supported in the buddy list, such that the user can readily determine whether a particular contact is available or determine the best way in which to communicate with the particular contact by viewing the buddy list. The presence information may be periodically updated or may be updated when a particular contact is selected.

34 Claims, 5 Drawing Sheets

BUDDY LISTS FOR INFORMATION VEHICLES

FIELD OF THE INVENTION

The present invention relates to communications, and in particular to establishing buddy lists in association with information vehicles, such as word processing or spreadsheet documents and email.

BACKGROUND OF THE INVENTION

People who collaborate on or in relation to various emails or documents often need to interact with one another through various communication mediums, including telephone or conference sessions, as well as instant messaging and the like. In many instances, the involved parties will find it desirable to have several of the interested parties involved in a multi-party interactive communication session. Unfortunately, it is often difficult and cumbersome to identify all interested parties and determine how best to communicate with them. Not only is it often difficult to find the various telephone numbers, addresses, and the like for the interested parties, there is no guarantee that the interested parties will be available without prior planning. Further, certain parties, if available, may only be available through specific communication channels. For example, an interested party who is traveling may only be available via mobile telephone.

Accordingly, there is a need for a way to facilitate communications with those parties associated with an information vehicle, such as an electronic document, email, or the like. There is a further need to determine the relative availability of the interested parties for establishing a communication or conference session. There is a need to provide these features in a user-friendly and efficient manner.

SUMMARY OF THE INVENTION

The present invention creates a buddy list in association with an information vehicle, such as a word processing document, presentation document, or email. The buddy list is created from contacts associated with the information vehicle, and includes communication information such as directory numbers or communication addresses, which are sufficient to establish communications with the contacts. Accordingly, the buddy list may be displayed to a user, and upon the selection of one or more contacts, communication sessions may be established with the selected contact or contacts. Presence information bearing on the relative availability of the contacts may be supported in the buddy list, such that the user can readily determine whether a particular contact is available or determine the best way in which to communicate with the particular contact by viewing the buddy list. The presence information may be periodically updated or may be updated when a particular contact is selected.

The buddy list may be provided by the application supporting the information vehicle or in a separate application that coordinates with the application supporting the information vehicle. Further, the buddy list may be created each time the information vehicle is opened and cleared when the information vehicle is closed. In one embodiment, multiple buddy lists may be associated with a given information vehicle. The contacts associated with the information vehicle may be divided into different categories, which correspond to the different buddy lists.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
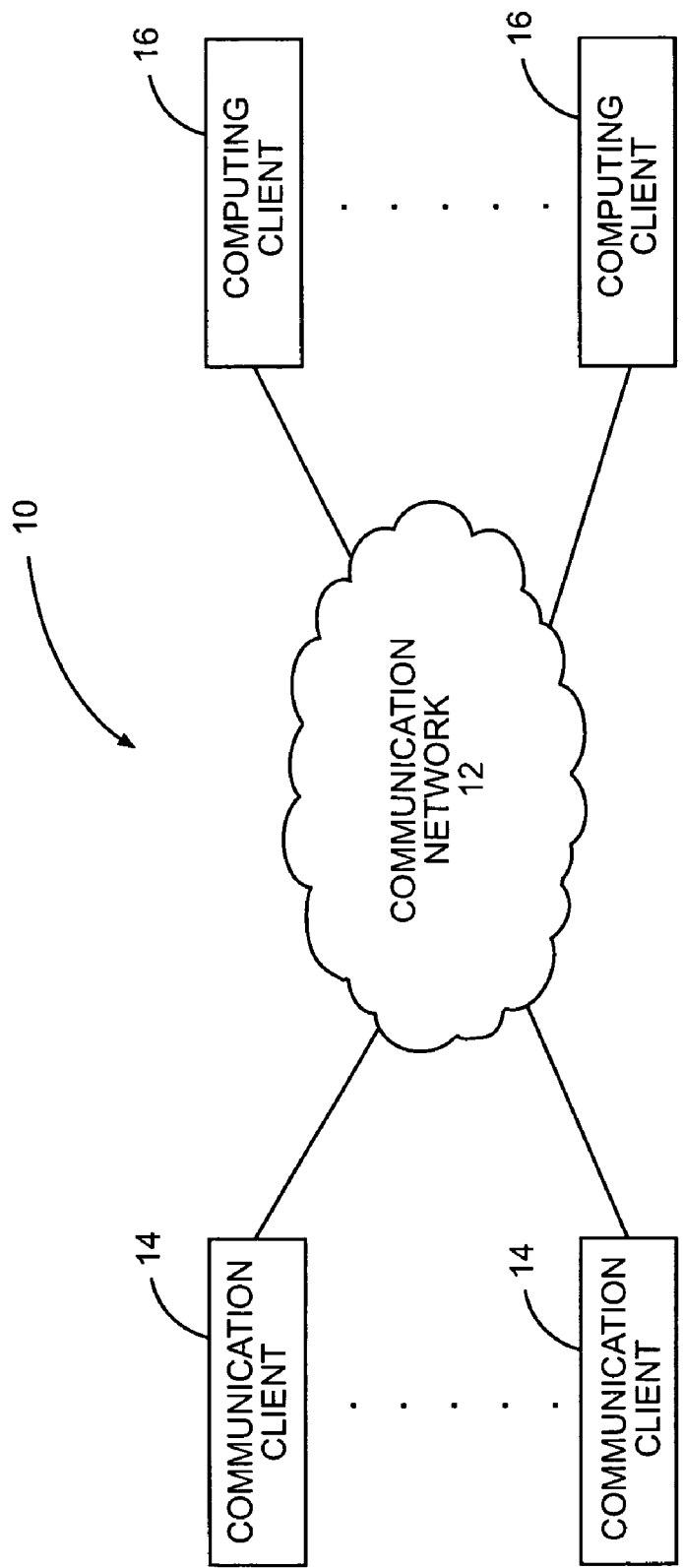
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention enables the dynamic creation of buddy lists in association with an information vehicle to enable interactive communications among the various entities within the buddy list. An information vehicle may take any number of forms, including email, documents, presentations, spreadsheets, and the like, which tend to be shared or worked on in a collaborate fashion by two or more people. For a given information vehicle, individuals are identified as being associated with the document and used to create the buddy list. The buddy list may include communication addresses, such as directory numbers, addresses, and the like, which are used to establish communications with the respective individuals. In select embodiments, the relative availability, or presence information, associated with the individuals may be provided or used to determine appropriate communication information to use when establishing communications.

The function used to create the buddy list may be associated with the application supporting the information vehicle, or may be provided in a separate application that is capable of interacting with the application supporting the information vehicle. The individuals associated with the information vehicle may be found from information provided in the information vehicle or by accessing another document or database in which interested individuals are identified.

The buddy list may be displayed to a user on the computing device supporting the information vehicle and its associated applications or on another device associated with the user. As such, the user can readily view all of the numbers in the buddy list and perhaps their communication information for establishing communications and any available presence information. The presence information may simply indicate whether or not a certain individual in the buddy list is available for communications, or may provide the communication information that should be used when establishing a communication session with the individual. When presence information is used, the communication information may change from time to time as the corresponding individual moves from one location to another, or as her relative availability changes. For additional information on the collection and use of presence information, attention is directed to co-assigned U.S. patent application Ser. Nos. 10/100,703 filed Mar. 19, 2004 entitled MONITORING NATURAL INTERACTION FOR PRESENCE DETECTION; 10/101,286 filed Mar. 19, 2002 entitled CUSTOMIZED PRESENCE INFORMATION DELIVERY; 10/119,923 filed Apr. 10, 2002 entitled PRESENCE INFORMATION BASED ON MEDIA ACTIVITY; and 10/119,783 filed Apr. 10, 2002 entitled PRESENCE INFORMATION SPECIFYING COMMUNICATION PREFERENCES, the disclosures of which are incorporated herein by reference in their entireties.

Figure 2:
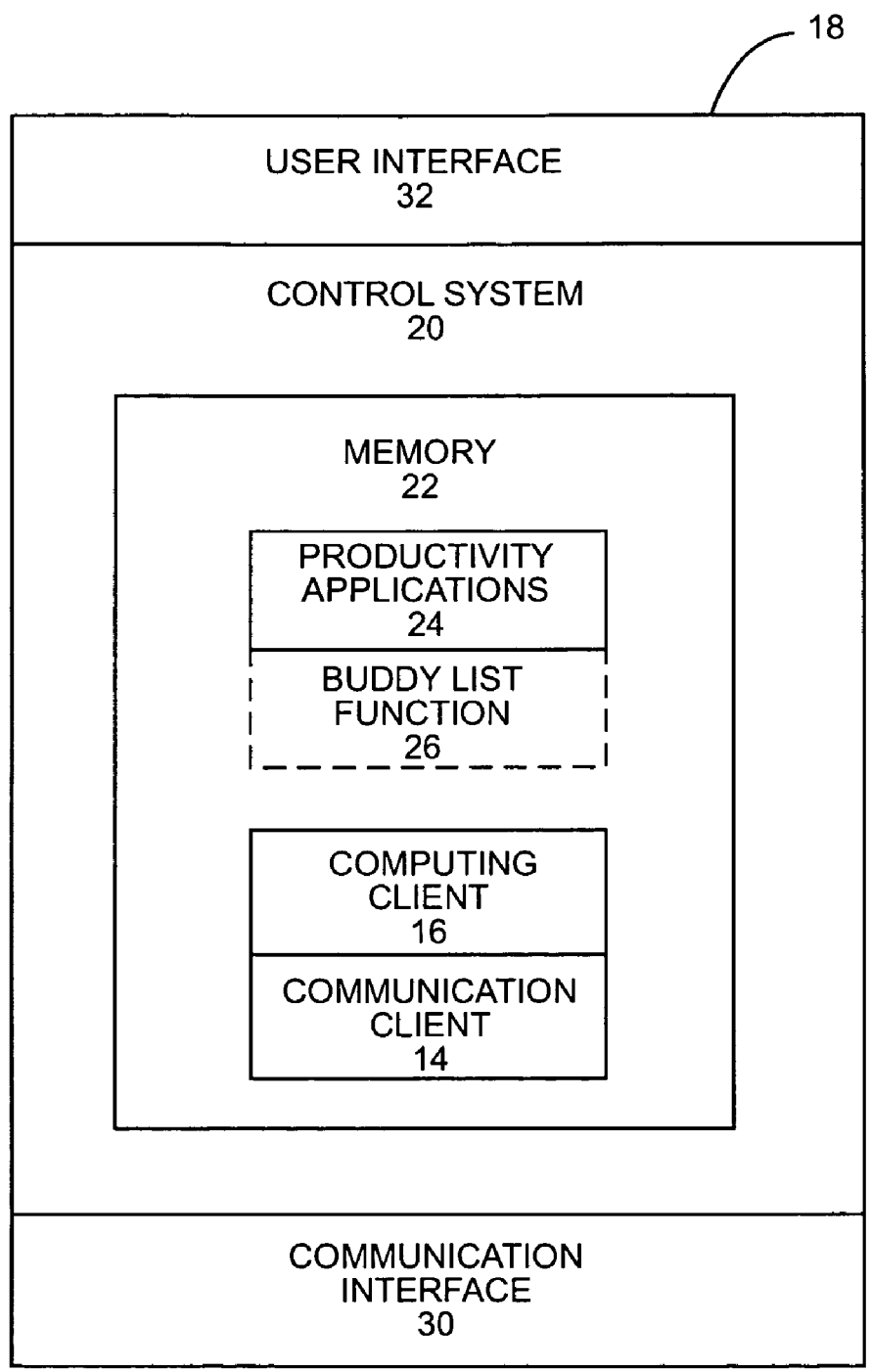
FIG. 2 is a block representation of a computing device according to one embodiment of the present invention.

Prior to delving into the details of the present invention, an overview of an exemplary communication environment and a computing device according to select embodiments of the present invention are illustrated in FIGS. 1 and 2, respectively. With particular reference to FIG. 1, a communication environment 10 is illustrated as being centered about a communication network 12, which may include packet- or circuit-switched networks that allow communications between various communication clients 14 and computing clients 16, which reside on separate or common entities. These entities may take various forms, but will generally include a computing device capable of running the communication client 14, the computing client 16, or a combination thereof. The communication clients 14 may be applications capable of facilitating communications with other communication clients on remote computing or communication devices. The computing client 16 will generally support various productivity and like processing applications.

An exemplary computing device 18 is illustrated in FIG. 2. As illustrated, the computing device 18 is centered about a control system 20, which has sufficient memory 22 to support various productivity applications 24 and a buddy list function 26, which may be part of the productivity applications 24 or may be configured to cooperate therewith. The memory 22 may also include a communication client 14 and a computing client 16 to run the various applications and functions. The control system 20 is adapted to identify contacts associated with an information vehicle and create a buddy list from the contacts, where the buddy list includes communication information sufficient to establish communications with the contacts. The control system 20 is also associated with a communication interface 30 to facilitate communications with remote entities, as well as a user interface 32 to support interaction with a user. The user interface 32 may include a mouse, a keypad, a microphone, a speaker, a display, or any combination thereof. With this or a similar configuration, the computing device 18 will be able to run various productivity applications 24, which may include communication applications such as instant messaging and email along with word processors, spreadsheets, presentation packages, and the like. The various documents, emails, and the like which represent the products of the various productivity applications 24 are referred to as information vehicles. Each information vehicle may be associated with any number of individuals or entities that have an interest in the information vehicle. These associated individuals or entities are referred to as contacts and may be associated with the information vehicle by having the contacts as part of the information vehicle or having the contacts associated outside of the information vehicle. In the latter case, a database of contacts for a specific information vehicle may be kept and made accessible as necessary.

The present invention creates a buddy list from the contacts associated with an information vehicle. Each of the contacts in the buddy list is associated with communication information, which represents the information necessary to establish communications with the particular contact. For example, the communication information may include a directory number, address, or the like, which is used to initiate and establish communications with the contact. When the information vehicle is active on a particular computing device 18, preferably the productivity application 24 or a separate buddy list function 26 will display the associated contact to the user, and when the user selects a particular contact from the buddy list, the computing device 18 will cooperate with the communication client 14 to initiate communications to the particular contact or contacts, if multiple contacts are selected. Communication may be established concurrently with multiple people in the buddy list (any subset or the entire group) via voice, instant messaging, or the like. Thus, the selection of multiple contacts would result in a conferencing scenario using the appropriate communication means.

In another embodiment, presence information bearing on the relative availability of the contact is accessed and displayed with the buddy list such that the user can determine whether or not a particular contact is available for communications by simply viewing the buddy list or selecting the contact for the presence information. The presence information may be obtained from an available presence system (not shown). Additional information on presence systems and the provision of presence information is provided in the previously incorporated references.

Figure 3:
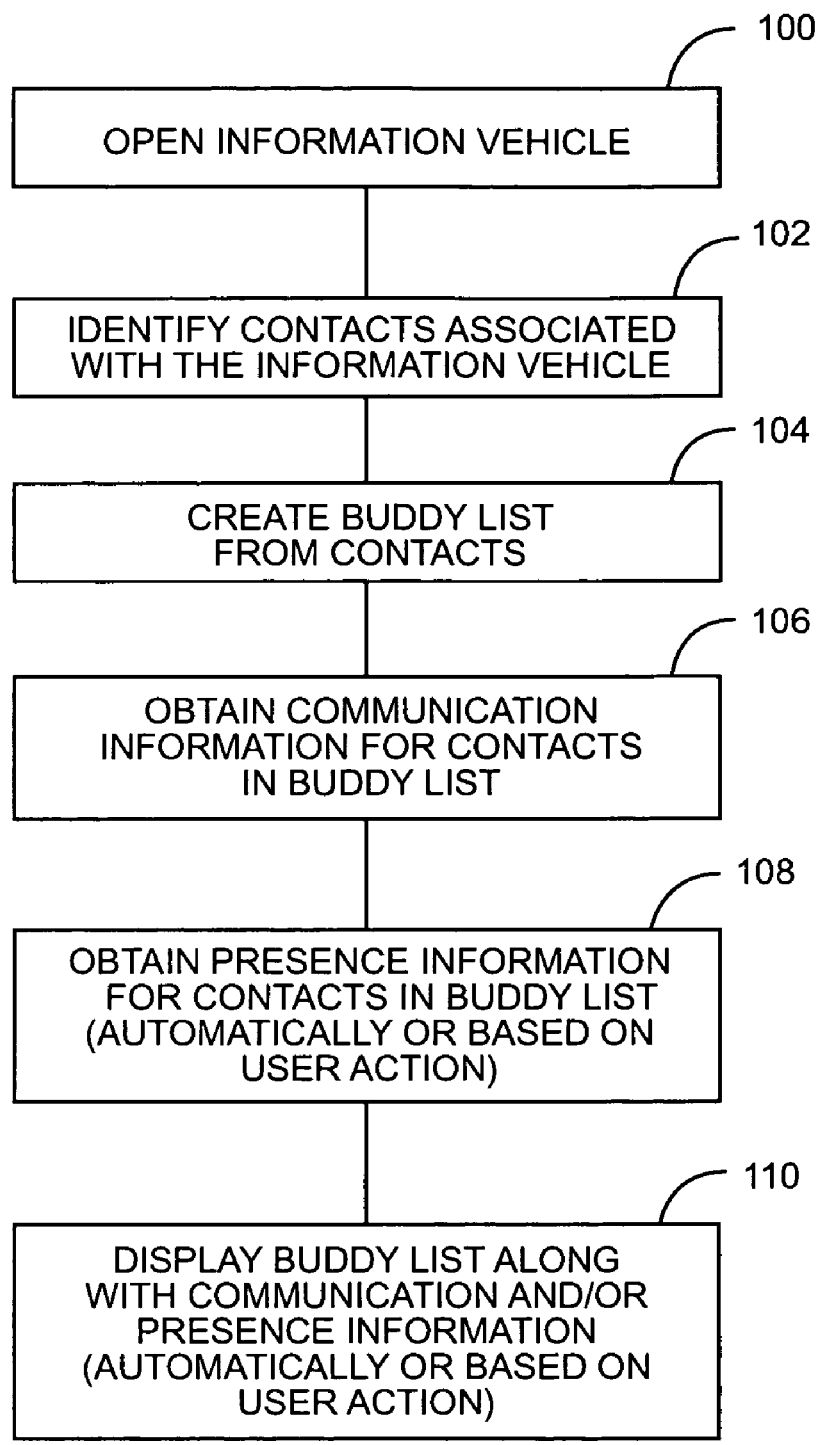
FIG. 3 is a flow diagram for establishing a buddy list in association with an information vehicle according to one embodiment of the present invention.

An exemplary flow diagram for creating and displaying a buddy list in association with an information vehicle is provided in FIG. 3. Initially, an information vehicle is opened by a corresponding productivity application 24 (step 100). The contacts associated with the information vehicle are identified by analyzing contact information within the information vehicle or by accessing a separate database that keeps track of associated contacts for the particular information vehicle (step 102). From the associated contacts, a buddy list is created (step 104). Communication information sufficient to initiate established communication sessions with the various contacts is obtained and associated with the buddy list (step 106). If presence information is being used, the presence information for the contacts in the buddy list is obtained (step 108). The presence information may be automatically obtained or obtained as necessary based on user action. To minimize the computational and communication load on the computing device 18, the presence information may be obtained when the user takes an action to highlight or select a particular contact or the buddy list in general. For example, the presence information may be obtained when the user runs the cursor over a window displaying the buddy list. Alternatively, the presence information for a given contact may only be obtained once the cursor is passed over or used to select a particular contact. Those skilled in the art will recognize various techniques for obtaining presence information based on user action.

At this point, the buddy list may be displayed in association with the information vehicle either within the same window, in a toolbar associated with an application running the information vehicle, or in a separate window associated with a different application that is dedicated to providing the buddy list function 26, or in a separate device associated with the user with which the information vehicle can communicate, when the buddy list function 26 is not incorporated in the information vehicle (step 110). The buddy list may be displayed in any number of ways and may be associated with various types of information, including communication information, presence information, or a combination thereof. Further, various icons or information display techniques may be used to effectively combine the display of each. For example, different icons or text may be associated with each contact and the text may be highlighted when the presence information is favorable for reaching the contact and not highlighted when the presence information is indicative that the contact is unavailable. When presence information is not used, the buddy list may simply be a list of the contacts, wherein the actual directory numbers or addresses are hidden but used when selected to establish a communication session with the computing device 18 or an associated telephony device. Alternatively, the actual directory numbers, addresses, or other communication information may form the buddy list, wherein the communication information represents the contact. Again, those skilled in the art will recognize numerous techniques for formatting and providing the contact list, communication information, and any available presence information to the user.

Figure 4:
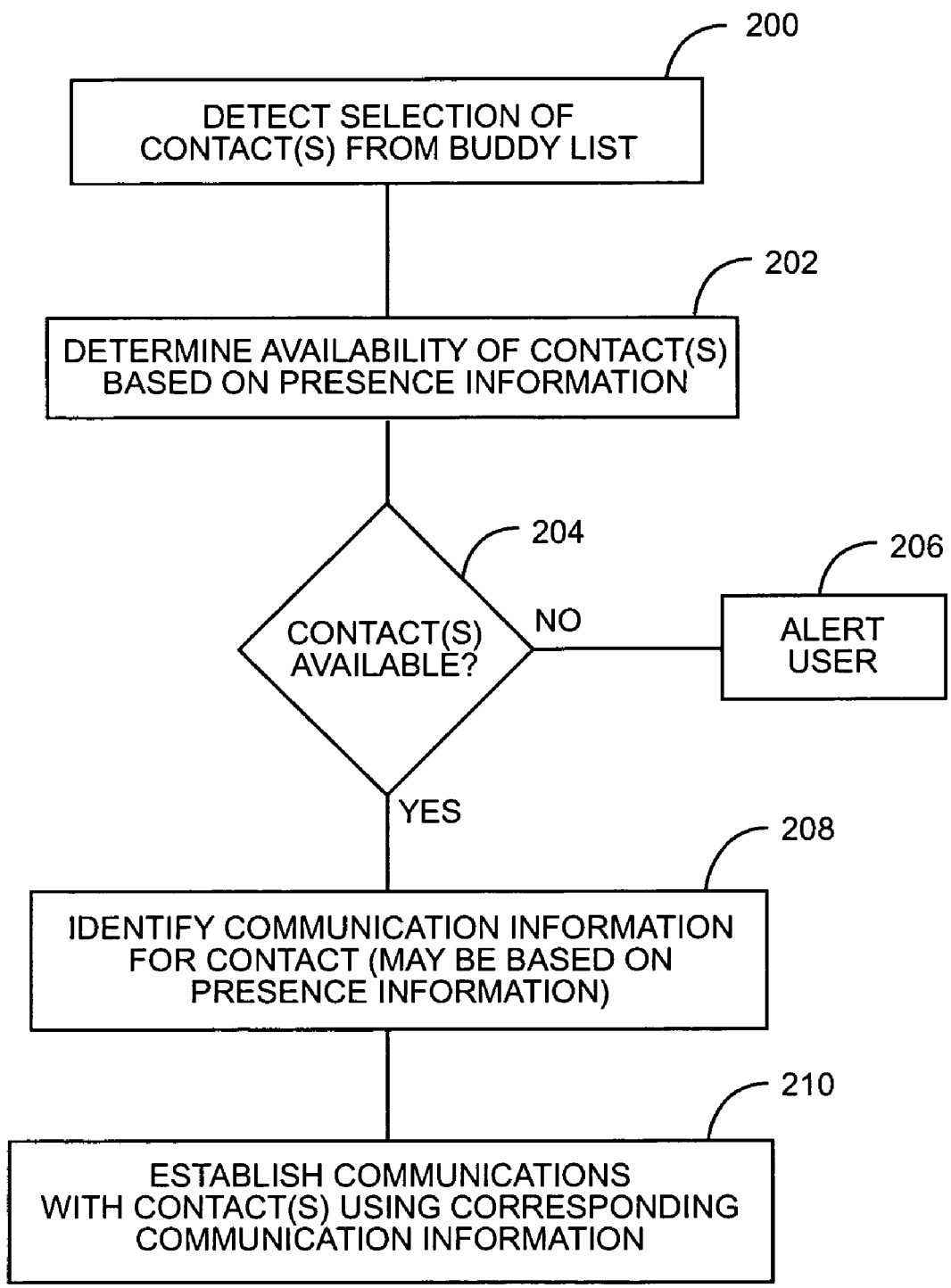
FIG. 4 is a flow diagram illustrating the use of presence information when establishing communications according to one embodiment of the present invention.

Turning now to FIG. 4, an exemplary flow diagram is provided for establishing communications by selecting one or more contacts in the buddy list. Initially, the computing device 18 will detect the selection of one or more contacts from the buddy list (step 200). If presence information is used, the computing device 18 will determine the availability of the contacts based on the presence information (step 202). This determination may include determining the best way in which to communicate with the particular contact or whether or not the contact is available for communications. If the selected contact or contacts are not available (step 204), an alert indicating as much is provided to the user (step 206). If the contacts are available for communications (step 204), the computing device 18 will identify the communication information for the contact (step 208) and establish communications with the contacts using the corresponding communication information (step 210). Communications may be established over packet- or circuit-switched networks and may be voice sessions, instant messaging sessions, or any available synchronous or asynchronous communication technique. If there is no presence information, communications may or may not be initiated, depending on how the system is configured.

Figure 5:
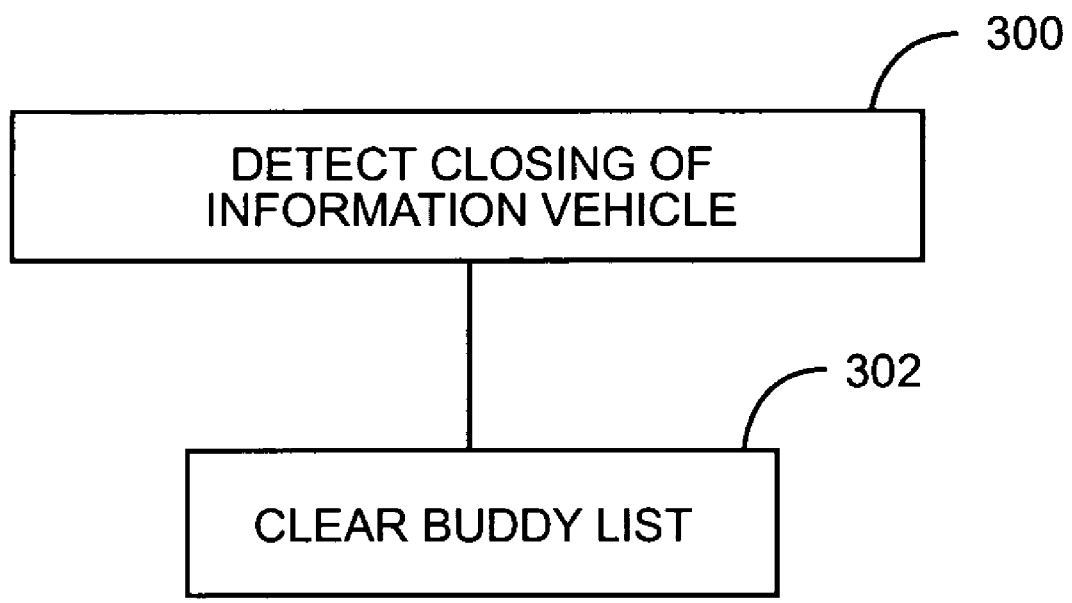
FIG. 5 is a flow diagram for closing an information vehicle according to one embodiment of the present invention.

The buddy list may be stored in association with the information vehicle or may be generated each time the information vehicle is opened. When the buddy list is recreated each time the information vehicle is opened, once the computing device 18 detects the closing of the information vehicle (step 300), the buddy list may be cleared (step 302), as illustrated in FIG. 5.

Notably, multiple buddy lists may be associated with an information vehicle. The different buddy lists may represent different categories of individuals or entities interested in the particular information vehicle. For example, if the information vehicle is an email, each of the primary participants, which are those listed in the "To:" field, may form a first buddy list, wherein individuals that are in the "Cc:" field or "Bcc:" field are provided in a second buddy list.

From the above, the present invention may take various forms; however, the creation of a buddy list of associated contacts for an information vehicle is created and displayed in association with the information vehicle. The buddy list may be integrated within the window or toolbar of the application providing the information vehicle, or in a separate application or window, or displayed on a separate device associated with the user of the information vehicle. The buddy list may indicate the relative availability of the contact, but will generally be associated with communication information sufficient to initiate and establish a communication session between the computing device 18 running the information vehicle or an associated telephony device and a remote device associated with the communication information of the contact selected.

Those skilled in the art will recognize improvements and modifications to the preferred embodiments of the present invention. All such improvements and modifications are considered within the scope of the concepts disclosed herein and the claims that follow.

What is claimed is:

1. A computing device comprising:
   a) a user interface;
   b) a control system associated with the user interface and adapted to:
      i) identify contacts associated with an information vehicle, wherein the information vehicle is a product of a productivity application where at least two contacts collaboratively share the product and the information vehicle is one of the group comprising a word processing document, presentation document, spreadsheet document, email, and productivity document where the computing device runs the information vehicle; and
      ii) create a buddy list from the contacts, the buddy list comprising communication information to allow for initiation and establishment of a communication session between the computing device and a remote device associated with one contact of the contacts, wherein the communication information is one of the group comprising a directory number and an address where the buddy list indicates an availability of the one contact and the buddy list is created when the information vehicle is opened and the control system is further adapted to clear the buddy list when the information vehicle is closed.

2. The computing device of claim 1 wherein the control system is further adapted to:
   iii) detect selection of at least one contact; and
   iv) establish communications with the at least one contact.

3. The computing device of claim 1 wherein the control system is further adapted to obtain the communication information for each of the contacts.

4. The computing device of claim 1 wherein the contacts are identified within the information vehicle.

5. The computing device of claim 1 wherein the contacts are identified outside of the information vehicle.

6. The computing device of claim 1 wherein the control system is further adapted to detect when the information vehicle is opened prior to creating the buddy list.

7. The computing device of claim 1 wherein the buddy list further comprises presence information for at least one of the contacts.

8. The computing device of claim 7 wherein the control system is further adapted to obtain the presence information for the at least one of the contacts.

9. The computing device of claim 8 wherein the presence information is obtained for a given contact of the at least one of the contacts when the given contact is selected by a user.

10. The computing device of claim 8 wherein the presence information is obtained on a periodic basis.

11. The computing device of claim 7 wherein the communication information for a given contact is based on the presence information.

12. The computing device of claim 1 wherein the control system is further adapted to display the buddy list in association with the information vehicle.

13. The computing device of claim 12 wherein the buddy list is displayed in a window of an application supporting the information vehicle.

14. The computing device of claim 12 wherein the buddy list is displayed outside of a window of an application supporting the information vehicle.

15. The computing device of claim 14 wherein the buddy list is displayed on a device other than one running the application.

16. The computing device of claim 1 wherein the contacts are divided into a plurality of groups and a plurality of buddy lists are created for each of the groups, each of the buddy lists comprising communication information sufficient to establish communications with the contacts for a given one of the buddy lists.

17. The computing device of claim 1 wherein the control system is further adapted to:
   iii) detect selection of a plurality of contacts; and
   iv) establish communications with the plurality of contacts to form a conference.

18. A system comprising:
   a) at least one communication interface;
   b) a user interface; and
   c) a control system associated with the at least one communication interface and the user interface and adapted to:
      i) identify contacts associated with an information vehicle, wherein the information vehicle is a product of a productivity application where at least two contacts collaboratively share the product and the information vehicle is one of the group comprising a word processing document, presentation document, spreadsheet document, email, and productivity document where the system runs the information vehicle; and
      ii) create a buddy list from the contacts, the buddy list comprising communication information to allow for initiation and establishment of a communication session between the system and a remote device associated with one contact of the contacts, wherein the communication information is one of the group comprising a directory number and an address where the buddy list indicates an availability of the one contact and the buddy list is created when the information vehicle is opened and the control system is further adapted to clear the buddy list when the information vehicle is closed.

19. The system of claim 18 wherein the control system is further adapted to:
   a) detect selection of at least one contact; and
   b) initiate communications with the at least one contact.

20. The system of claim 18 wherein the control system is further adapted to obtain the communication information for each of the contacts.

21. The system of claim 18 wherein the contacts are identified within the information vehicle.

22. The system of claim 18 wherein the contacts are identified outside of the information vehicle.

23. The system of claim 18 wherein the control system is further adapted to detect when the information vehicle is opened prior to creating the buddy list.

24. The system of claim 18 wherein the buddy list further comprises presence information for at least one of the contacts.

25. The system of claim 24 wherein the control system is further adapted to obtain the presence information for the at least one of the contacts.

26. The system of claim 25 wherein the presence information is obtained for a given contact of the at least one of the contacts when the given contact is selected by a user.

27. The system of claim 25 wherein the presence information is obtained on a periodic basis.

28. The system of claim 24 wherein the communication information for a given contact is based on the presence information.

29. The system of claim 18 wherein the control system is further adapted to display the buddy list in association with the information vehicle.

30. The system of claim 29 wherein the buddy list is displayed in a window of an application supporting the information vehicle.

31. The system of claim 29 wherein the buddy list is displayed outside of a window of an application supporting the information vehicle.

32. The system of claim 31 wherein the buddy list is displayed on a device other than one running the application.

33. The system of claim 18 wherein the contacts are divided into a plurality of groups and a plurality of buddy lists are created for each of the groups, each of the buddy lists comprising communication information sufficient to establish communications with the contacts for a given one of the buddy lists.

34. The system of claim 18 wherein the control system is further adapted to:
   a) detect selection of a plurality of contacts; and
   b) establish communications with the plurality of contacts to form a conference.

* * * * *